US012585776B2

(12) United States Patent
Morishige et al.

(10) Patent No.: US 12,585,776 B2
(45) Date of Patent: Mar. 24, 2026

(54) INFORMATION PROCESSING SYSTEM AND BIOS UPDATE METHOD

(71) Applicant: Lenovo (Singapore) Pte. Ltd., Singapore (SG)

(72) Inventors: Yusaku Morishige, Kanagawa (JP); Ken Sasaki, Kanagawa (JP); Kazuya Shibayama, Kanagawa (JP); Naoyuki Araki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 203 days.

(21) Appl. No.: 18/492,127

(22) Filed: Oct. 23, 2023

(65) Prior Publication Data

US 2024/0160740 A1      May 16, 2024

(30) Foreign Application Priority Data

Nov. 16, 2022    (JP) ................................. 2022-183191

(51) Int. Cl.
| | |
|---|---|
| *G06F 9/44* | (2018.01) |
| *G06F 21/57* | (2013.01) |
| *G06F 21/64* | (2013.01) |

(52) U.S. Cl.
CPC ............ *G06F 21/572* (2013.01); *G06F 21/64* (2013.01)

(58) Field of Classification Search
CPC ................................ G06F 21/572; G06F 21/64
See application file for complete search history.

(56) References Cited

U.S. PATENT DOCUMENTS

| | | | |
|---|---|---|---|
| 9,930,051 B1 | 3/2018 | Potlapally et al. | |
| 11,681,809 B2* | 6/2023 | Ishikawa | ............... G06F 21/572 726/23 |
| 2004/0186998 A1* | 9/2004 | Kim | ........................ H04L 63/08 713/169 |

(Continued)

FOREIGN PATENT DOCUMENTS

| | | |
|---|---|---|
| JP | 2001222421 A | 8/2001 |
| JP | 2017-072897 A | 4/2017 |
| JP | 2022-084319 A | 6/2022 |

OTHER PUBLICATIONS

Extended European Search Report issued in European Application No. 23200959.7, dated Apr. 2, 2024 (6 pages).

(Continued)

*Primary Examiner* — Qamrun Nahar
(74) *Attorney, Agent, or Firm* — Osha Bergman Watanabe & Burton LLP

(57) ABSTRACT

An information processing system includes a server that assigns a signature of a server manager to a capsule file encapsulating a program of an extended function of a BIOS and provides the capsule file to an information processing apparatus. The information processing apparatus includes a BIOS storage and a BIOS processor that extracts the program from the capsule file to store the program in the BIOS storage in a case in which validity of the capsule file acquired from the server is confirmed based on the signature, permits execution of the program in a case in which validity of the program is confirmed based on a signature certificate of a user and a signature of the user, and prohibits execution of the program in a case in which the validity of the program is not confirmed.

6 Claims, 8 Drawing Sheets

(56) References Cited

U.S. PATENT DOCUMENTS

| | | | |
|---|---|---|---|
| 2018/0129809 A1 | 5/2018 | Zhang et al. | |
| 2019/0325138 A1* | 10/2019 | Ishikawa | G06F 21/572 |
| 2023/0168901 A1* | 6/2023 | Hung | G06F 8/65 |
| | | | 713/2 |
| 2023/0385419 A1* | 11/2023 | Gowda | G06F 21/572 |
| 2023/0394154 A1* | 12/2023 | Gowda | G06F 21/50 |

OTHER PUBLICATIONS

Wikipedia. "Unified Extensible Firmware Interface", Oct. 20, 2017, XP055585891, (21 pages).
Retrieved from the Internet. "Signing UEFI Applications and Drivers for UEFI Secure Boot", Nov. 1, 2012, XP055125999, (47 pages).

* cited by examiner

100

40

1

NW1

50

INFORMATION PROCESSING SYSTEM AND BIOS UPDATE METHOD

CROSS-REFERENCE TO RELATED APPLICATIONS

This application claims priority to Japanese Patent Application No. 2022-183191 filed on Nov. 16, 2022, the contents of which are hereby incorporated herein by reference in their entirety.

BACKGROUND OF THE INVENTION

Field of the Invention

The present invention relates to an information processing system and a BIOS update method.

Description of the Related Art

A technology of updating a basic input output system (BIOS) of an information processing apparatus, such as a personal computer, is known (for example, see Japanese Unexamined Patent Application Publication No. 2001-222421). In addition, in recent years, with the extension of a function of the BIOS, a storage capacity of a BIOS memory that stores the program of the BIOS is increased, and it is proposed to store a part of the program of the BIOS in a solid state drive (SSD).

In an information processing system in the related art that updates the BIOS, it is difficult to easily incorporate, for example, a service prepared by a user, such as a company, into the BIOS, and there is a demand for a technology of more securely and easily extending the function of the BIOS.

SUMMARY OF THE INVENTION

The present invention provides an information processing system and a BIOS update method capable of more securely and easily extending function of the BIOS.

An information processing system according to a first aspect of the present invention includes a server apparatus (server) that encapsulates a program of an extended function of a basic input output system (BIOS) to which a signature of a user is assigned, assigns a signature of a server manager to an encapsulated capsule file, and provides the capsule file to an information processing apparatus, and the information processing apparatus, in which the information processing apparatus includes a BIOS storage unit that stores a program of the BIOS, and a BIOS processing unit (BIOS processor) that extracts the program of the extended function from the capsule file to store the program of the extended function in the BIOS storage unit in a case in which validity of the capsule file acquired from the server apparatus is confirmed based on the signature of the server manager, permits execution of the program of the extended function in a case in which validity of the program of the extended function is confirmed based on a signature certificate of the user and the signature of the user, and prohibits execution of the program of the extended function in a case in which the validity of the program of the extended function is not confirmed.

In addition, in the information processing system according to the above-described aspect of the present invention, the BIOS storage unit may include a BIOS memory that is a rewritable non-volatile memory, which is not connectable from an operating system (OS) without going through the BIOS, and stores at least a boot program required to start up the OS and management information of the extended function, and a BIOS area that is a partial area of a solid state drive (SSD) and is not connectable from the OS without going through the BIOS, and in a case in which the validity of the capsule file is confirmed, the BIOS processing unit may extract the program of the extended function from the capsule file to store the program of the extended function in the BIOS area.

In addition, in the information processing system according to the above-described aspect of the present invention, in a case in which the management information of the extended function is stored in the BIOS memory and the program of the extended function is not stored in the BIOS area when the BIOS is started up, the BIOS processing unit may reacquire the capsule file corresponding to the program of the extended function from the server apparatus.

In addition, in the information processing system according to the above-described aspect of the present invention, in a case in which the signature certificate of the user is not stored in the BIOS memory, the BIOS processing unit may prohibit execution of the program of the extended function.

In addition, in the information processing system according to the above-described aspect of the present invention, the server apparatus may include an update file storage unit (update file storage) that stores the capsule file to which the signature of the server manager is assigned, and a distribution processing unit (distribution processor) that transmits, in response to a distribution request for the capsule file, the capsule file corresponding to the distribution request to the information processing apparatus.

In addition, in the information processing system according to the above-described aspect of the present invention, in a case in which the validity of the capsule file is confirmed when the information processing apparatus is restarted up after storing the capsule file acquired from the server apparatus in an area different from the BIOS area of the SSD, the BIOS processing unit may extract the program of the extended function from the capsule file, and store the program of the extended function in the BIOS area.

In addition, a basic input output system (BIOS) update method according to a second aspect of the present invention of updating a BIOS of an information processing apparatus including a BIOS storage unit (BIOS storage) that stores a program of the BIOS includes a distribution step of, via a server apparatus (server), encapsulating a program of an extended function of the BIOS to which a signature of a user is assigned, assigning a signature of a server manager to an encapsulated capsule file, and providing the capsule file to the information processing apparatus, and a BIOS processing step of, via the information processing apparatus, extracting the program of the extended function from the capsule file to store the program of the extended function in the BIOS storage unit in a case in which validity of the capsule file acquired from the server apparatus is confirmed based on the signature of the server manager, permitting execution of the program of the extended function in a case in which validity of the program of the extended function is confirmed based on a signature certificate of the user and the signature of the user, and prohibiting execution of the program of the extended function in a case in which the validity of the program of the extended function is not confirmed.

The above-described aspects of the present invention can more securely and easily extend the function of the BIOS.

DETAILED DESCRIPTION OF THE INVENTION

Hereinafter, an information processing system and a BIOS update method according to one or more embodiments of the present invention will be described with reference to the drawings.

Figure 1:
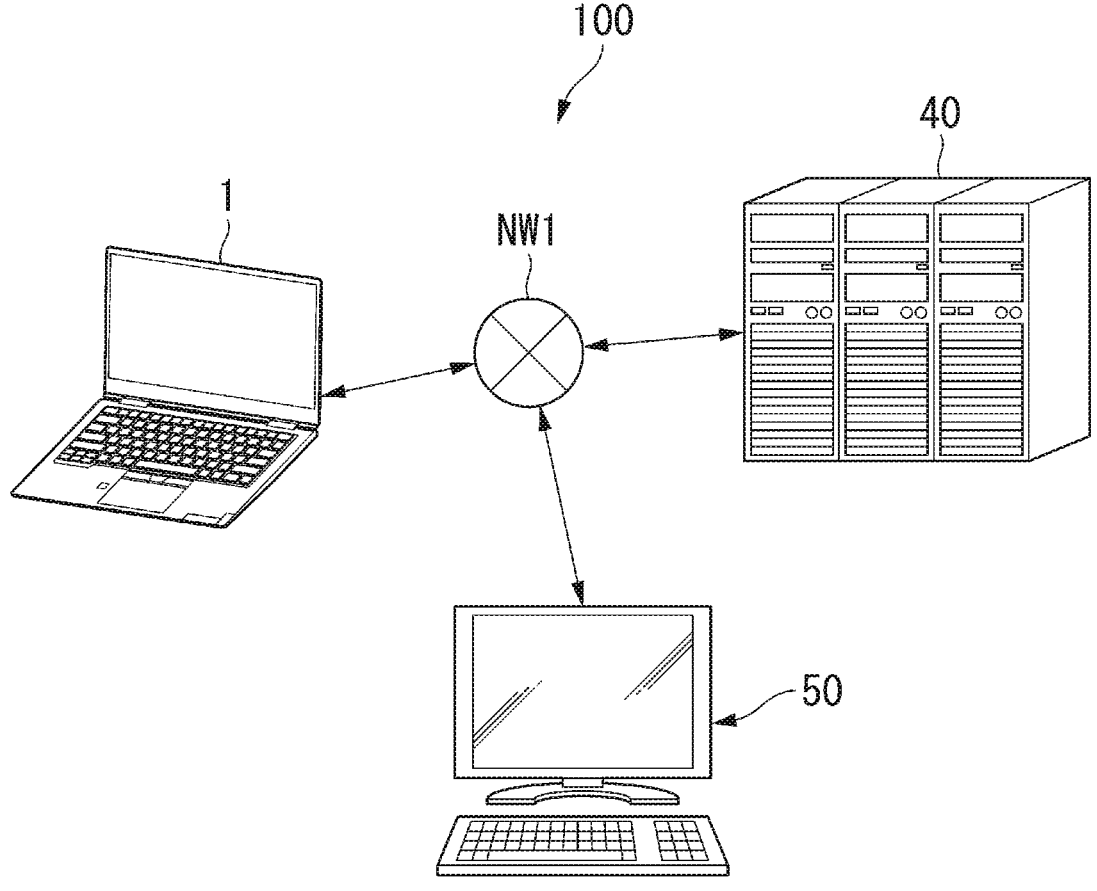
FIG. 1 is a schematic block diagram illustrating an example of a configuration of an information processing system according to one or more embodiments.

FIG. 1 is a schematic block diagram illustrating an example of a configuration of an information processing system 100 according to one or more embodiments.

As illustrated in FIG. 1, the information processing system 100 includes a laptop personal computer (laptop PC) 1, a server apparatus (server) 40, and a user terminal apparatus 50.

It should be noted that, in one or more embodiments, the laptop PC 1 will be described as an example of the information processing apparatus.

The laptop PC 1, the user terminal apparatus 50, and the server apparatus 40 can be connected to each other via a network NW1.

The server apparatus 40 is a server apparatus that can be connected from the laptop PC 1 and the user terminal apparatus 50, and is a server apparatus managed by a manufacturer, a vender, or a supplier that manufactures, sells, or provides the laptop PC 1. The server apparatus 40 provides a BIOS update service, such as updating a program of a BIOS of the laptop PC 1 or adding a BIOS application, which is a program of extending a function of the BIOS (hereinafter, referred to as a BIOS app).

It should be noted that, in one or more embodiments, a manager of the server apparatus 40 is a manufacturer, a vender, or a supplier. In addition, a user is a company, an association, an organization, or the like that uses the laptop PC 1.

In addition, in one or more embodiments, the BIOS app (extended function of the BIOS) is a program provided by the user.

The server apparatus 40 encapsulates, for example, the program of the BIOS app (extended function of the BIOS) to which a signature of the user is assigned, assigns a signature of a server manager to an encapsulated capsule file, and provides the capsule file to the laptop PC 1. It should be noted that the details of the configuration of the server apparatus 40 will be described below.

The user terminal apparatus 50 is a terminal apparatus owned by the user (company, association, organization, or the like) who uses and manages the laptop PC 1 and is, for example, a personal computer (PC), a tablet terminal apparatus, or the like. The user terminal apparatus 50 can be connected to the server apparatus 40 via the network NW1, and registers the BIOS app provided by the user with the server apparatus 40 via the network NW1. It should be noted that, in a case in which the user terminal apparatus 50 registers the BIOS app with the server apparatus 40, the user terminal apparatus 50 assigns the signature of the user to the BIOS app, and registers the BIOS app with the server apparatus 40. In addition, the details of the configuration of the user terminal apparatus 50 will be described below.

The laptop PC 1 (an example of an information processing apparatus) is a PC that is a target of update processing of the BIOS. The laptop PC 1 is, for example, an apparatus managed by the user (company, association, organization, or the like), and a person who uses the laptop PC 1 is, for example, a person who belongs to the user (company, association, organization, or the like). In addition, the laptop PC 1 can be connected to the server apparatus 40 via the network NW1, and receives an update program, such as the BIOS app, provided from the server apparatus 40 via the network NW1.

Here, a main hardware configuration of the laptop PC 1 will be described with reference to FIG. 2.

Figure 2:
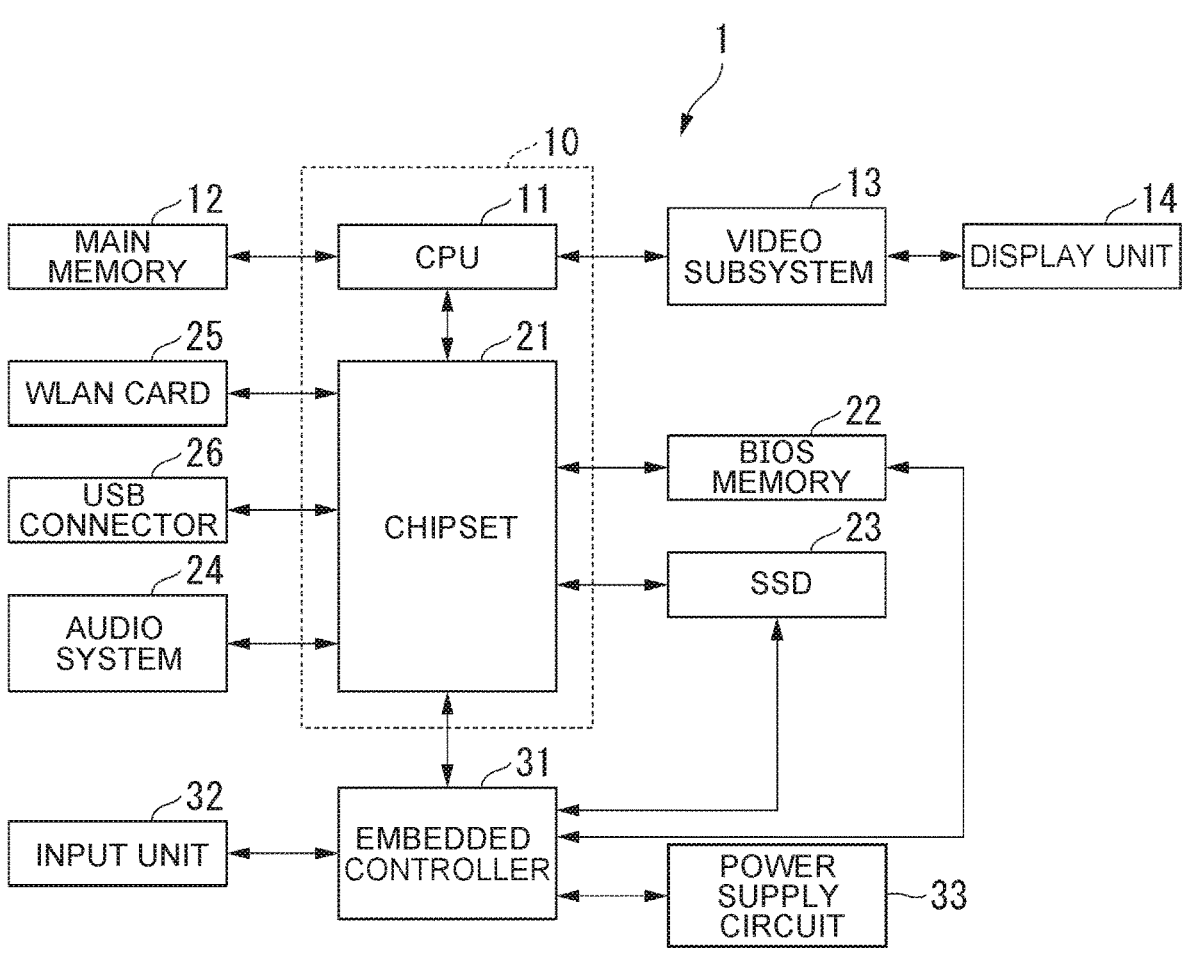
FIG. 2 is a diagram illustrating an example of a main hardware configuration of a laptop PC according to one or more embodiments.

FIG. 2 is a diagram illustrating an example of the main hardware configuration of the laptop PC 1 according to one or more embodiments.

As illustrated in FIG. 2, the laptop PC 1 includes a central processing unit (CPU) 11, a main memory 12, a video subsystem 13, a display unit 14, a chipset 21, a BIOS memory 22, a solid state drive (SSD) 23, an audio system 24, a wireless local area network (WLAN) card 25, a universal serial bus (USB) connector 26, an embedded controller 31, an input unit 32, and a power supply circuit 33.

It should be noted that, in one or more embodiments, the CPU 11 and the chipset 21 correspond to a main control unit 10. In addition, the main control unit 10 is an example of a processor (main processor) that executes a program stored in a memory (main memory 12).

The CPU 11 executes various arithmetic processing by program control to control the entire laptop PC 1.

The main memory 12 is a writable memory used as a read area for an execution program of the CPU 11 or as a work area for writing processing data of the execution program. The main memory 12 is configured by, for example, a plurality of dynamic random access memory (DRAM) chips. This execution program includes the BIOS, an operating system (OS), various drivers for operating hardware of peripheral devices, various services/utilities, an application program, and the like.

The video subsystem 13 is a subsystem for realizing a function related to image display, and includes a video controller. The video controller processes a drawing instruction from the CPU 11, writes the processed drawing information to a video memory, reads the drawing information from the video memory, and outputs the drawing information as drawing data (display data) to the display unit 14.

The display unit 14 is, for example, a liquid crystal display, and displays a display screen based on the drawing data (display data) output from the video subsystem 13. In one or more embodiments, the display unit 14 displays an error message when the BIOS is started up or a boot menu of the BIOS.

The chipset 21 includes controllers, such as a USB, an serial AT attachment (ATA), a serial peripheral interface (SPI) bus, a peripheral component interconnect (PCI) bus, a PCI-Express bus, and a low pin count (LPC) bus, and is connected to a plurality of devices. In FIG. 2, as an example of the device, the BIOS memory 22, the SSD 23, the audio system 24, the WLAN card 25, and the USB connector 26 are connected to the chipset 21.

The BIOS memory 22 is configured by, for example, an electrically rewritable non-volatile memory, such as electrically erasable programmable read only memory (EEPROM) or a flash ROM. The BIOS memory 22 is, for example, an SPI memory connected to the chipset 21 and the embedded controller 31 by an SPI bus (SMBus), and stores system firmware and the like for controlling the BIOS, the embedded controller 31, and the like. Details of the information stored in the BIOS memory 22 in one or more embodiments will be described below.

The SSD 23 (an example of a non-volatile storage device) stores the OS, various drivers, various services/utilities, an application program, some programs of the BIOS, and various data. The SSD 23 is connected to the chipset 21 by, for example, the PCI-Express bus, and is connected to the embedded controller 31 by the SPI bus (SMBus). Details of the information stored in the SSD 23 in one or more embodiments will be described below.

The audio system 24 records, reproduces, and outputs sound data.

The WLAN card 25 is connected to a network by a wireless LAN to perform data communication. The WLAN card 25 is, for example, connected to the server apparatus 40 via the network NW1, and performs data communication with the server apparatus 40 to download the update program of the BIOS.

The USB connector 26 is a connector for connecting peripheral devices by using a USB.

The embedded controller 31 (an example of a sub-control unit) is a one-chip microcomputer that monitors and controls various devices (peripheral devices, sensors, or the like) regardless of a system state of the laptop PC 1. Also, the embedded controller 31 has a power supply management function of controlling the power supply circuit 33. It should be noted that the embedded controller 31 is configured by a CPU, a ROM, a RAM, and the like (not illustrated), and also includes a plurality of channels of A/D input terminals, D/A output terminals, timers, and digital input/output terminals. For example, the BIOS memory 22, the SSD 23, the input unit 32, the power supply circuit 33, and the like are connected to the embedded controller 31 via these input and output terminals, and the embedded controller 31 controls the operations of the BIOS memory 22, the SSD 23, the input unit 32, the power supply circuit 33, and the like.

The input unit 32 is, for example, an input device, such as a keyboard, a pointing device, or a touch pad.

The power supply circuit 33 includes, for example, a DC/DC converter, a charge/discharge unit, a battery unit, an AC/DC adapter, and the like, and a direct current voltage supplied from the AC/DC adapter or the battery unit is converted into a plurality of voltages required for operating the laptop PC 1. In addition, the power supply circuit 33 supplies power to each unit of the laptop PC 1 based on the control from the embedded controller 31.

Hereinafter, a functional configuration of the information processing system 100 according to one or more embodiments will be described with reference to FIG. 3.

Figure 3:
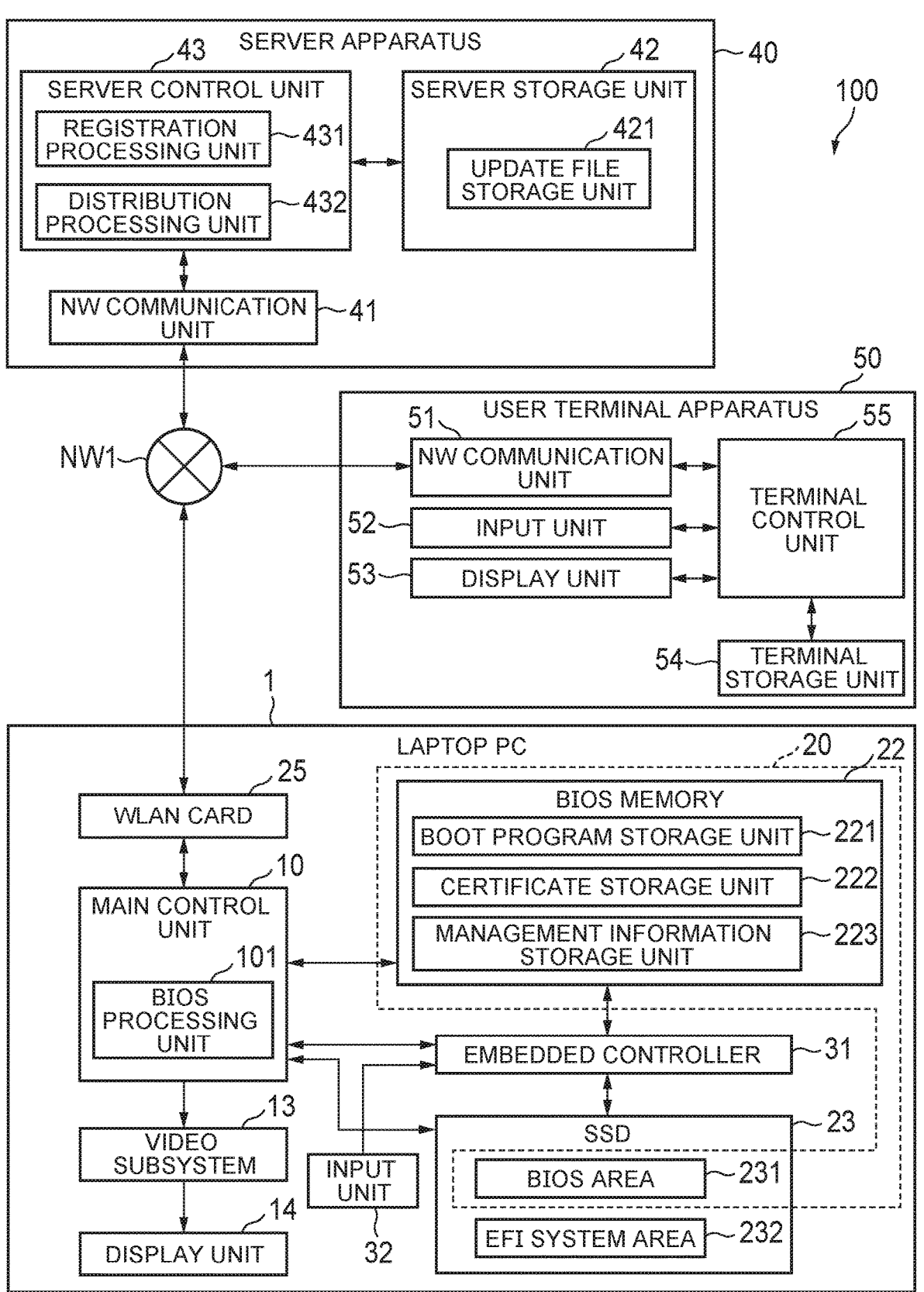
FIG. 3 is a functional block diagram illustrating an example of a functional configuration of the information processing system according to one or more embodiments.

FIG. 3 is a functional block diagram illustrating an example of the functional configuration of the information processing system 100 according to one or more embodiments.

As illustrated in FIG. 3, the information processing system 100 includes the laptop PC 1, the server apparatus 40, and the user terminal apparatus 50. The laptop PC 1, the server apparatus 40, and the user terminal apparatus 50 can be connected to each other via the network NW1.

The user terminal apparatus 50 is a terminal apparatus owned by the user, and registers the BIOS app provided to the laptop PC 1 with the server apparatus 40. The user terminal apparatus 50 includes a network (NW) communication unit 51, an input unit 52, a display unit 53, a terminal storage unit 54, and a terminal control unit 55.

The NW communication unit 51 is, for example, a wireless LAN module, a LAN module, or the like, is connected to the network NW1 by network communication, such as a wireless LAN or a wired LAN, and communicates with the server apparatus 40.

The input unit 52 is, for example, an input device, such as a touch panel, a keyboard, or a mouse, and receives various information used by the user terminal apparatus 50. The input unit 52 receives, for example, various operation information when registering the BIOS app with the server apparatus 40.

The display unit 53 is a display device, such as a liquid crystal display, for example, and displays various information used by the user terminal apparatus 50.

The terminal storage unit 54 is configured by, for example, a RAM, an HDD, an SSD, or the like, and stores various information used by the user terminal apparatus 50.

The terminal control unit 55 is, for example, a processor including a CPU, and collectively controls the user terminal apparatus 50. The terminal control unit 55 is connected to the server apparatus 40 via the NW communication unit 51 in response to an operation by the input unit 52, and executes processing of registering a program of the BIOS app for adding the function of the BIOS prepared in advance with the server apparatus 40. For example, the terminal control unit 55 assigns the signature of the user to the program of the BIOS app, and registers the program with the server apparatus 40. Here, the signature of the user is identification information for proving validity of the BIOS app, and it is possible to confirm that the BIOS app is provided by the user by confirming the signature of the user.

The server apparatus 40 includes a NW communication unit 41, a server storage unit 42, and a server control unit 43.

The NW communication unit 41 is, for example, a wireless LAN module, a LAN module, or the like, is connected to the network NW1 by network communication, such as a wireless LAN or a wired LAN, and communicates with the laptop PC 1 or the user terminal apparatus 50.

The server storage unit 42 is, for example, a storage device, such as an HDD or an SSD, and stores various information used by the server apparatus 40. The server storage unit 42 includes, for example, an update file storage unit 421 (update file storage).

The update file storage unit 421 is, for example, a storage unit realized by an HDD or an SSD, and stores an update file of the BIOS, such as the BIOS app. The update file storage unit 421 encapsulates, for example, the program of the BIOS app with the signature acquired from the user terminal apparatus 50, and stores the capsule file to which the signature of the server manager is assigned.

The server control unit 43 is, for example, a processor including a CPU, and collectively controls the server apparatus 40. The server control unit 43 includes a registration processing unit 431 and a distribution processing unit 432 (distribution processor).

The registration processing unit 431 is a functional unit realized by causing the CPU to execute the program stored in the storage unit (not illustrated). The registration processing unit 431 acquires the program of the BIOS app with the signature of the user from the user terminal apparatus 50 via the NW communication unit 41, encapsulates the acquired program of the BIOS app with the signature by the signature of the server manager, and generates the capsule file to which the signature of the server manager is assigned. The registration processing unit 431 registers the generated capsule file by storing the capsule file in the update file storage unit 421.

The distribution processing unit 432 is a functional unit realized by causing the CPU to execute the program stored in the storage unit (not illustrated). In response to a distribution request for the capsule file received from the laptop PC 1 via the NW communication unit 41, the distribution processing unit 432 acquires the corresponding capsule file from the update file storage unit 421. The distribution processing unit 432 transmits (distributes) the acquired capsule file to which the signature of the server manager is assigned, to the laptop PC 1 via the NW communication unit 41.

The laptop PC 1 includes the main control unit 10, the video subsystem 13, the display unit 14, the BIOS memory 22, the SSD 23, the WLAN card 25, the embedded controller 31, and the input unit 32.

The BIOS memory 22 is a rewritable non-volatile memory that cannot be connected (cannot be accessed) from the OS without going through the BIOS, and stores at least a boot program required to start up the OS and management information of the BIOS app. It should be noted that the BIOS memory 22 can be accessed only from the BIOS and the embedded controller 31. The BIOS memory 22 includes a boot program storage unit 221, a certificate storage unit 222, and a management information storage unit 223.

The boot program storage unit 221 is a storage unit realized by the BIOS memory 22, and stores a program that mainly executes boot processing (for example, OS startup processing) among the programs of the BIOS.

The certificate storage unit 222 is a storage unit realized by the BIOS memory 22, and stores a signature certificate for confirming the validity of the program of the BIOS. The certificate storage unit 222 stores, for example, the signature certificate of the user who provides the added BIOS app.

The management information storage unit 223 is a storage unit realized by the BIOS memory 22, and for example, stores the management information of the added BIOS app. The management information includes, for example, an application ID (app ID), a description (name), a hash value, and the like of the BIOS app. The management information storage unit 223 is, for example, a UEFI variable area (variable area).

The SSD 23 includes a BIOS area 231 and an EFI system area 232.

The BIOS area 231 is a partial area of the SSD 23, and is an area (boot partition) that cannot be connected (cannot be accessed) from the OS without going through the BIOS. The BIOS area 231 is an area that is connected to the main control unit 10 by the SPI bus (SMBus) via the embedded controller 31 and the BIOS memory 22, and cannot be directly accessed from the OS. It should be noted that the BIOS area 231 can be accessed only from the BIOS and the embedded controller 31.

In one or more embodiments, the BIOS area 231 stores the program of the BIOS app to which the signature of the user is assigned.

It should be noted that, in one or more embodiments, the BIOS memory 22 and the BIOS area 231 correspond to the BIOS storage unit 20 (BIOS storage). The BIOS storage unit 20 is a storage unit that stores the program of the BIOS, and is a storage unit that can be accessed only from the BIOS and the embedded controller 31 and cannot be directly accessed from the OS.

An extensible firmware interface (EFI) system area 232 is a partial area of the SSD 23, and is a system area used by the BIOS and the OS. The EFI system area 232 is an area that can be accessed from the main control unit 10 by the PCI-Express bus. The EFI system area 232 temporarily saves, for example, the capsule file acquired from the server apparatus 40.

The main control unit 10 is a functional unit realized by causing the CPU 11 and the chipset 21 to execute the programs stored in the BIOS memory 22 and the SSD 23, and executes various types of processing of the laptop PC 1 based on the BIOS or the OS. The main control unit 10 includes a BIOS processing unit 101 (BIOS processor).

The BIOS processing unit 101 is a functional unit realized by causing the CPU 11 and the chipset 21 to execute the programs stored in the BIOS memory 22 and the BIOS area 231. The BIOS processing unit 101 executes various types of processing based on the BIOS. For example, in a case in which validity of the capsule file acquired from the server apparatus 40 is confirmed based on the signature of the server manager, the BIOS processing unit 101 extracts the program of the BIOS app from the capsule file to store the program of the BIOS app in the BIOS storage unit 20 (for example, the BIOS area 231). In a case in which the validity of the capsule file is confirmed, the BIOS processing unit 101 extracts the program of the BIOS app from the capsule file to store the program of the BIOS app in the BIOS area 231.

In addition, the BIOS processing unit 101 executes the BIOS app by using secure boot. In a case in which validity of the program of the BIOS app is confirmed based on the signature certificate of the user and the signature of the user, the BIOS processing unit 101 permits the execution of the program of the BIOS app to execute the BIOS app. In addition, for example, in a case in which the validity of the program of the BIOS app is not confirmed, such as a case in which the signature certificate of the user who provides the BIOS app is not stored in the certificate storage unit 222, the BIOS processing unit 101 prohibits the execution of the program of the BIOS app.

In addition, the BIOS processing unit 101 executes processing of starting up the BIOS by using the secure boot. The BIOS processing unit 101 executes power on self test (POST) processing and starts up the BIOS by causing the CPU 11 and the chipset 21 to execute the boot program stored in the boot program storage unit 221.

In addition, in a case in which the management information of the BIOS app is stored in the BIOS memory 22 and the program of the BIOS app is not stored in the BIOS area 231 when the BIOS processing unit 101 starts up the BIOS, the BIOS processing unit 101 determines that the SSD 23 is replaced. In a case in which the SSD 23 is replaced, the BIOS processing unit 101 reacquires the capsule file corresponding to the program of the BIOS app from the server apparatus 40.

Hereinafter, an operation of the information processing system 100 according to one or more embodiments will be described with reference to the drawings.

Figure 4:
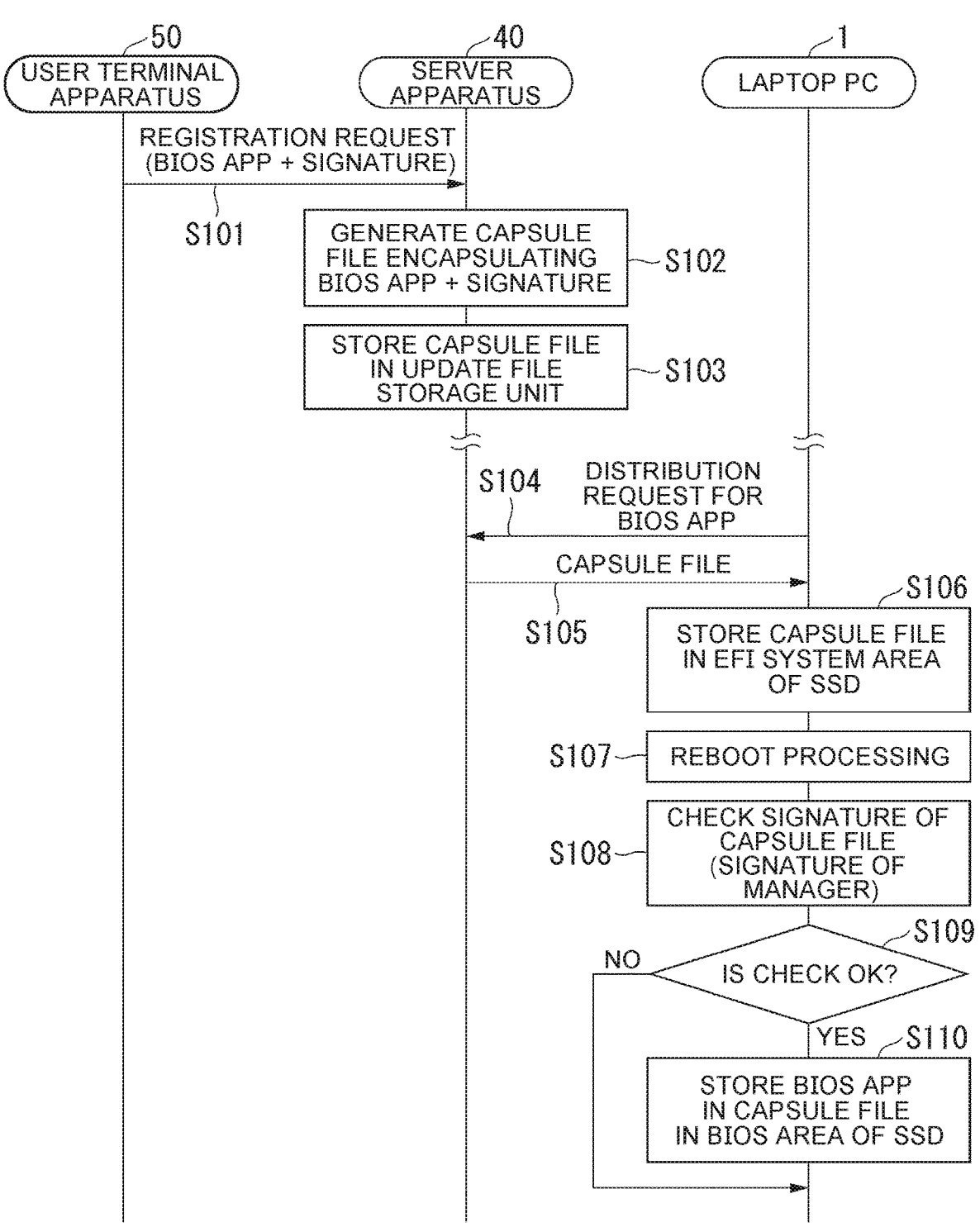
FIG. 4 is a diagram illustrating an example of acquisition processing of a BIOS app of the information processing system according to one or more embodiments.
Figure 5:
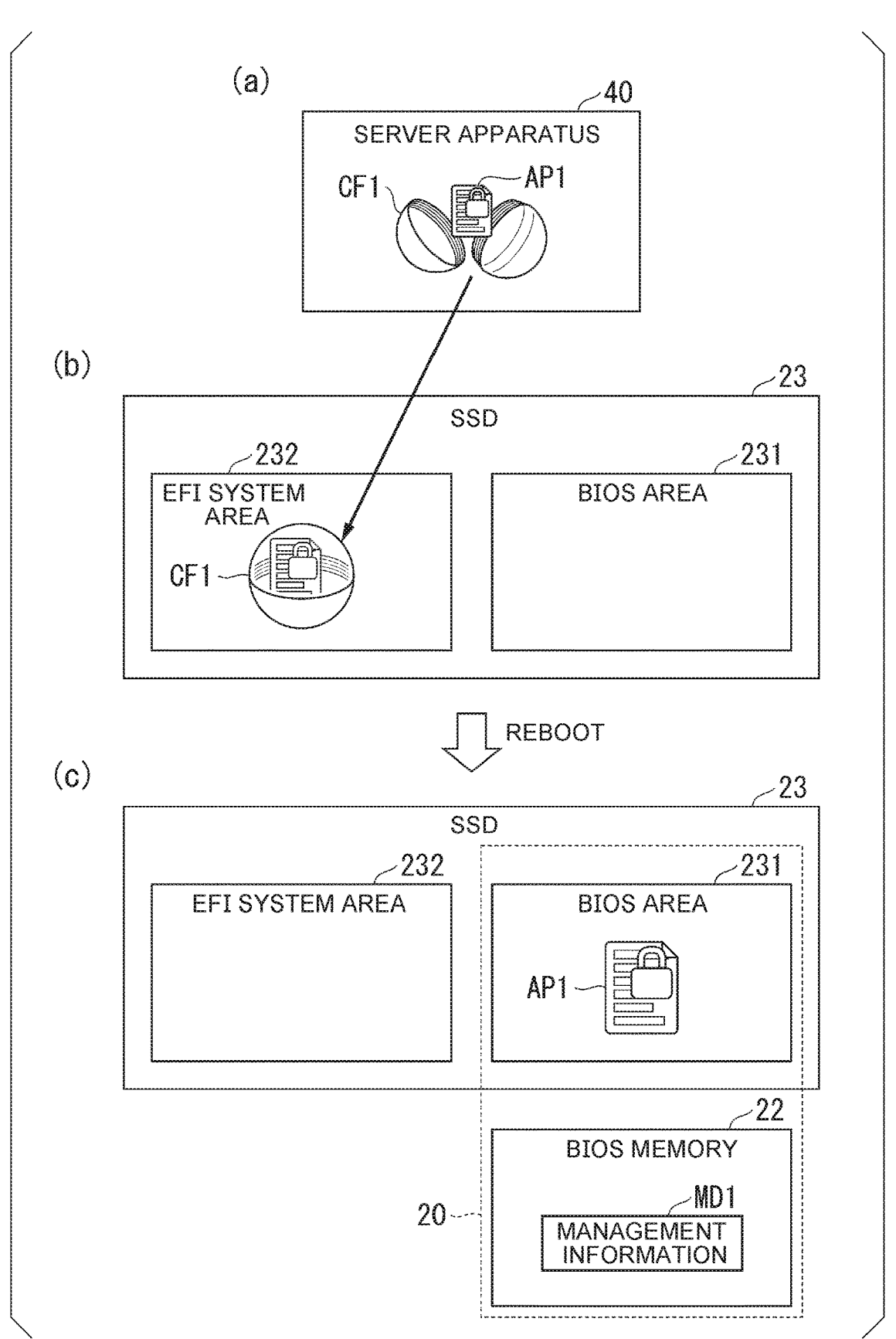
FIG. 5 is a diagram illustrating an example of a state in the acquisition processing of the BIOS app of the information processing system according to one or more embodiments.

FIG. 4 is a diagram illustrating an example of acquisition processing of the BIOS app of the information processing system 100 according to one or more embodiments. In addition, FIG. 5 is a diagram illustrating an example of a state in the acquisition processing of the BIOS app of the information processing system according to one or more embodiments.

As illustrated in FIG. 4, the user terminal apparatus 50 first transmits a registration request including the BIOS app and the signature to the server apparatus 40 (step S101). The terminal control unit 55 of the user terminal apparatus 50 is connected to the server apparatus 40 via the NW communication unit 51 in response to an operation by the input unit 52, and transmits the registration request in which the signature of the user is assigned to the program of the BIOS app prepared in advance, to the server apparatus 40 via the NW communication unit 51.

Next, the server apparatus 40 generates the capsule file encapsulating the BIOS app and the signature (step S102). In response to the registration request including the BIOS app and the signature received via the NW communication unit 41, the registration processing unit 431 of the server apparatus 40 encapsulates a BIOS app AP1 to which the signature is assigned, as illustrated in (a) of FIG. 5, and generates a capsule file CF1 to which the signature of the server manager is assigned.

Next, the registration processing unit 431 stores the capsule file CF1 in the update file storage unit 421 (step S103), that is, the registration processing unit 431 registers the generated capsule file CF1 in the update file storage unit 421.

Next, the laptop PC 1 transmits the distribution request for the BIOS app AP1 to the server apparatus 40 (step S104). The BIOS processing unit 101 of the laptop PC 1 transmits the distribution request for the BIOS app AP1 to the server apparatus 40 via the WLAN card 25.

Next, the server apparatus 40 transmits the capsule file CF1 to the laptop PC 1 in response to the distribution request for the BIOS app AP1 (step S105). The distribution processing unit 432 of the server apparatus 40 acquires the capsule file CF1 encapsulating the program of the BIOS app AP1 from the update file storage unit 421, and transmits the capsule file CF1 to which the signature of the server manager is assigned, to the laptop PC 1 via the NW communication unit 41.

Next, the laptop PC 1 stores the capsule file CF1 in the EFI system area 232 of the SSD 23 (step S106). As illustrated in (b) of FIG. 5, the BIOS processing unit 101 of the laptop PC 1 stores the capsule file CF1 received from the server apparatus 40 via the WLAN card 25 in the EFI system area 232.

Next, the BIOS processing unit 101 executes reboot processing (step S107). The BIOS processing unit 101 restarts up the laptop PC 1, and restarts up the BIOS.

Next, the BIOS processing unit 101 checks the signature of the capsule file CF1 (signature of the server manager) (step S108). The BIOS processing unit 101 reads out the capsule file CF1 from the EFI system area 232, and confirms the validity of the capsule file CF1 by the signature of the server manager.

Next, the BIOS processing unit 101 determines whether or not the check is OK (step S109). The BIOS processing unit 101 determines whether or not the validity of the capsule file CF1 is confirmed. In a case in which the check is OK (validity of the capsule file CF1 is confirmed) (step S109: YES), the BIOS processing unit 101 proceeds with the processing to step S110. In addition, in a case in which the check is not OK (validity of the capsule file CF1 is not confirmed) (step S109: NO), the BIOS processing unit 101 skips the processing of step S110.

In step S110, the BIOS processing unit 101 stores the BIOS app AP1 in the capsule file CF1 in the BIOS area 231 of the SSD 23. The BIOS processing unit 101 extracts the BIOS app AP1 to which the signature of the user is assigned from the capsule file CF1 to store the BIOS app AP1 in the BIOS area 231 of the SSD 23, as illustrated in (c) of FIG. 5. Here, the BIOS area 231 is an area that can be accessed only from the BIOS and the embedded controller 31, and the BIOS processing unit 101 stores the program of the BIOS app AP1 in the BIOS area 231. In addition, the BIOS processing unit 101 stores management information MD1 (for example, app ID, description, hash value, and the like) of the BIOS app AP1 in the management information storage unit 223 of the BIOS memory 22.

Hereinafter, processing in a case in which the BIOS app AP1 is executed on the laptop PC 1 will be described with reference to FIGS. 6 to 8.

Figure 6:
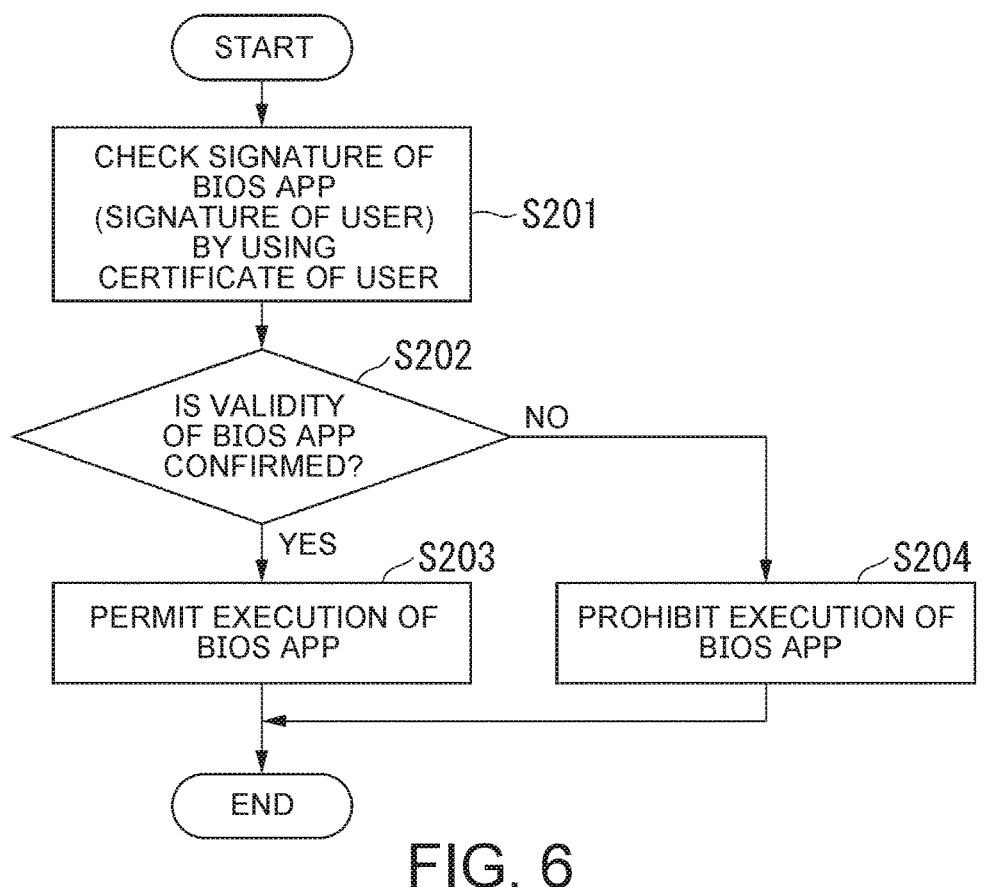
FIG. 6 is a flowchart illustrating an example of execution processing of the BIOS app of the information processing system according to one or more embodiments.

FIG. 6 is a flowchart illustrating an example of secure boot processing of the BIOS app AP1 of the information processing system 100 according to one or more embodiments. Here, processing of preventing improper execution of the BIOS app AP1 by the secure boot will be described.

As illustrated in FIG. 6, in a case in which the BIOS processing unit 101 of the laptop PC 1 executes the BIOS app, the BIOS processing unit 101 first checks the signature of the BIOS app (signature of the user) by using the certificate (signature certificate) of the user (step S201). The BIOS processing unit 101 confirms the validity of the BIOS app AP1 stored in the BIOS area 231 by using the certificate (signature certificate) of the user stored in the certificate storage unit 222.

Next, the BIOS processing unit 101 determines whether or not the validity of the BIOS app AP1 is confirmed (step S202). In a case in which the validity of the BIOS app AP1 is confirmed by the certificate (signature certificate) of the user (step S202: YES), the BIOS processing unit 101 proceeds with the processing to step S203. In addition, in a case in which the validity of the BIOS app AP1 is not confirmed by the certificate (signature certificate) of the user (step S202: NO), the BIOS processing unit 101 proceeds with the processing to step S204. It should be noted that a case in which the validity of the BIOS app AP1 is not confirmed here includes a case in which the certificate storage unit 222 does not store the certificate of the user who provides the BIOS app AP1.

In step S203, the BIOS processing unit 101 permits the execution of the BIOS app AP1. As a result, the BIOS app AP1 can be executed, and the BIOS processing unit 101 executes, for example, the BIOS app AP1 after the processing of step S203.

In addition, in step S204, the BIOS processing unit 101 prohibits the execution of the BIOS app AP1. As a result, it is impossible to execute the BIOS app AP1. The BIOS processing unit 101 terminates the processing after the processing of step S203.

Figure 7:
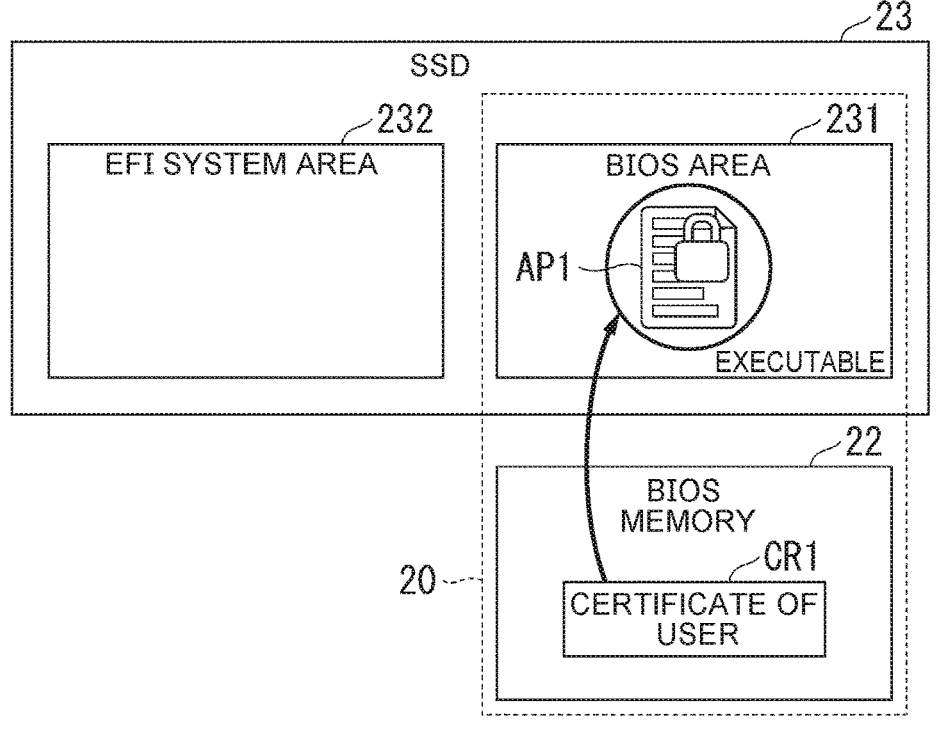
FIG. 7 is a diagram illustrating an example of the execution processing of the BIOS app in a normal case of the information processing system according to one or more embodiments.

FIG. 7 is a diagram illustrating an example of the execution processing of the BIOS app AP1 in a normal case of the information processing system 100 according to one or more embodiments.

In the example illustrated in FIG. 7, the BIOS app AP1 is stored in the BIOS area 231 of the SSD 23, and a certificate CR1 of the user who provides the BIOS app AP1 is stored in the BIOS memory 22 (certificate storage unit 222). In this case, since the validity of the BIOS app AP1 can be confirmed by using the certificate CR1 of the user, the BIOS processing unit 101 permits the execution of the BIOS app AP1. As a result, the BIOS processing unit 101 can normally execute the BIOS app AP1.

Figure 8:
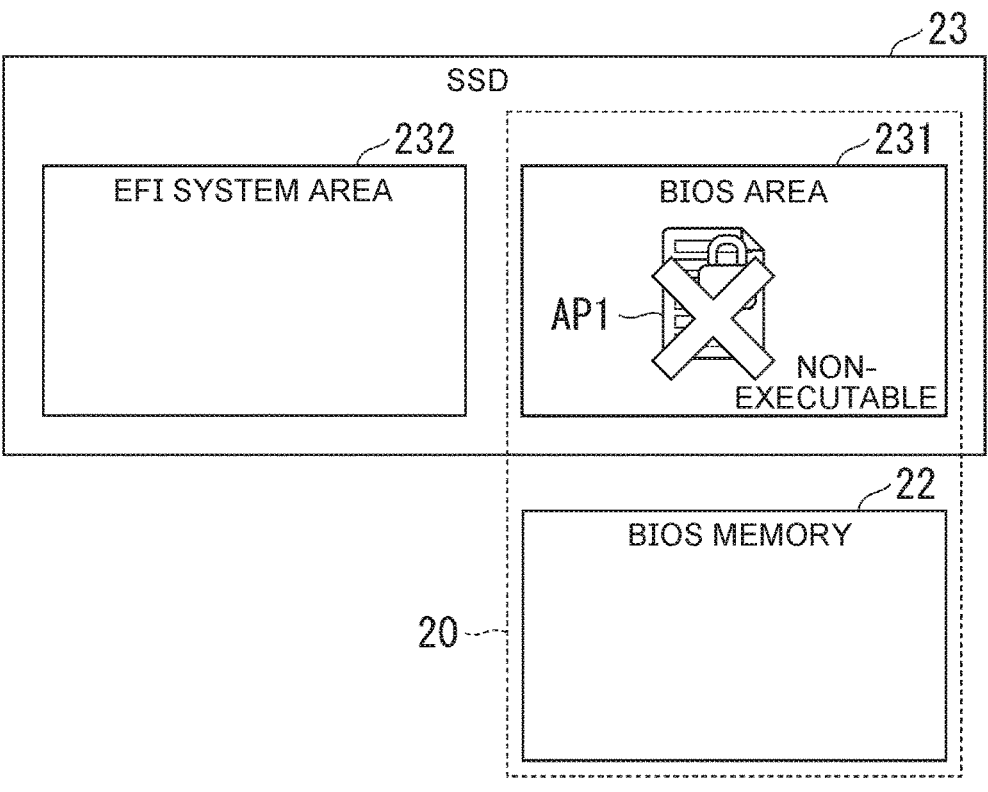
FIG. 8 is a diagram illustrating an example of execution prohibition processing of the BIOS app in a case in which an SSD of the information processing system according to one or more embodiments is improperly used.

In addition, FIG. 8 is a diagram illustrating an example of execution prohibition processing of the BIOS app AP1 in a case in which the SSD 23 of the information processing system 100 according to one or more embodiments is improperly used.

The example illustrated in FIG. 8 illustrates, for example, a case in which the above-described SSD 23 illustrated in FIG. 7 is stolen by a third party with malicious intent and attached to a PC owned by the third party.

In this case, the BIOS app AP1 is stored in the BIOS area 231 of the SSD 23, and the certificate CR1 of the user who provides the BIOS app AP1 is not stored in the BIOS memory 22 (certificate storage unit 222). Therefore, the BIOS processing unit 101 cannot confirm the validity of the BIOS app AP1 by using the certificate CR1 of the user, and prohibits the execution of the BIOS app AP1.

In such a case, in a case in which the SSD 23 is stolen and used improperly, the BIOS processing unit 101 cannot execute the BIOS app AP1.

Hereinafter, restoring processing in a case in which the SSD 23 of the laptop PC 1 is replaced in the information processing system according to one or more embodiments will be described with reference to FIGS. 9 and 10.

Figure 9:
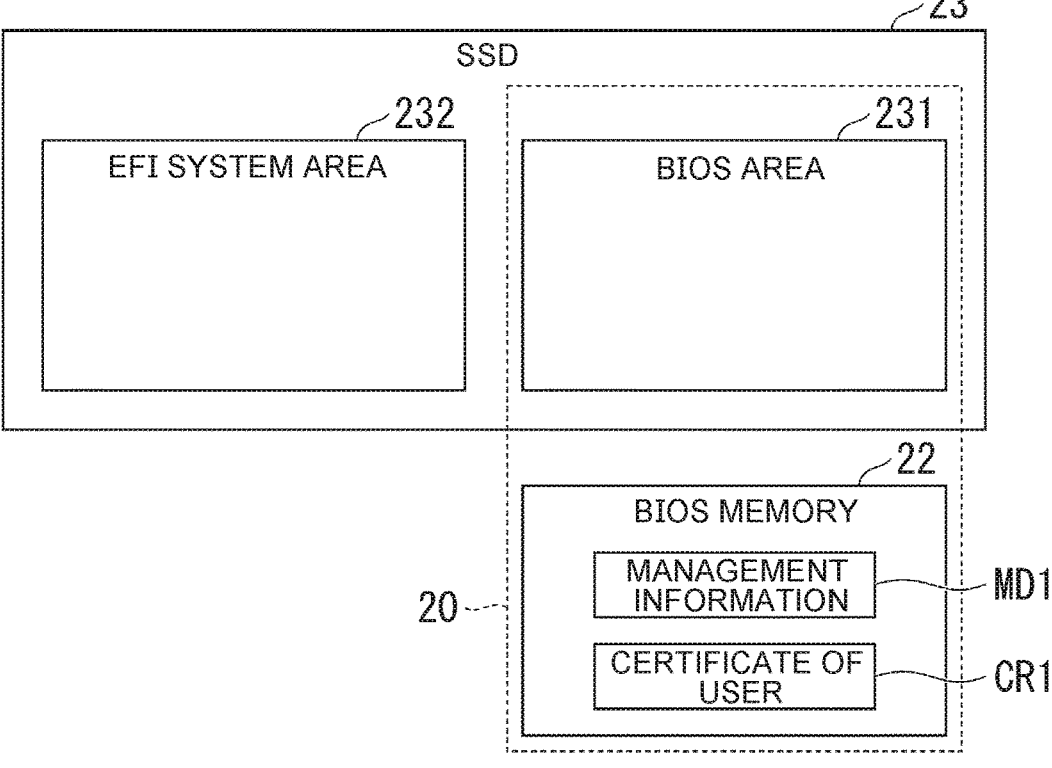
FIG. 9 is a diagram illustrating an example in a case in which an SSD of the laptop PC is replaced in an information processing system 100 according to one or more embodiments.

FIG. 9 is a diagram illustrating an example in a case in which the SSD of the laptop PC 1 is replaced in the information processing system 100 according to one or more embodiments. Here, a state immediately after the SSD 23 of the laptop PC 1 is replaced is illustrated.

In FIG. 9, since the laptop PC 1 is just after the SSD 23 is replaced, the SSD 23 is in a state in which the BIOS app AP1 is not stored, but the BIOS memory 22 is in a state in which the management information MD1 of the BIOS app AP1 and the certificate CR1 of the user are stored. In a case in which the laptop PC 1 is started up in such a state, the startup processing illustrated in FIG. 10 is executed.

Figure 10:
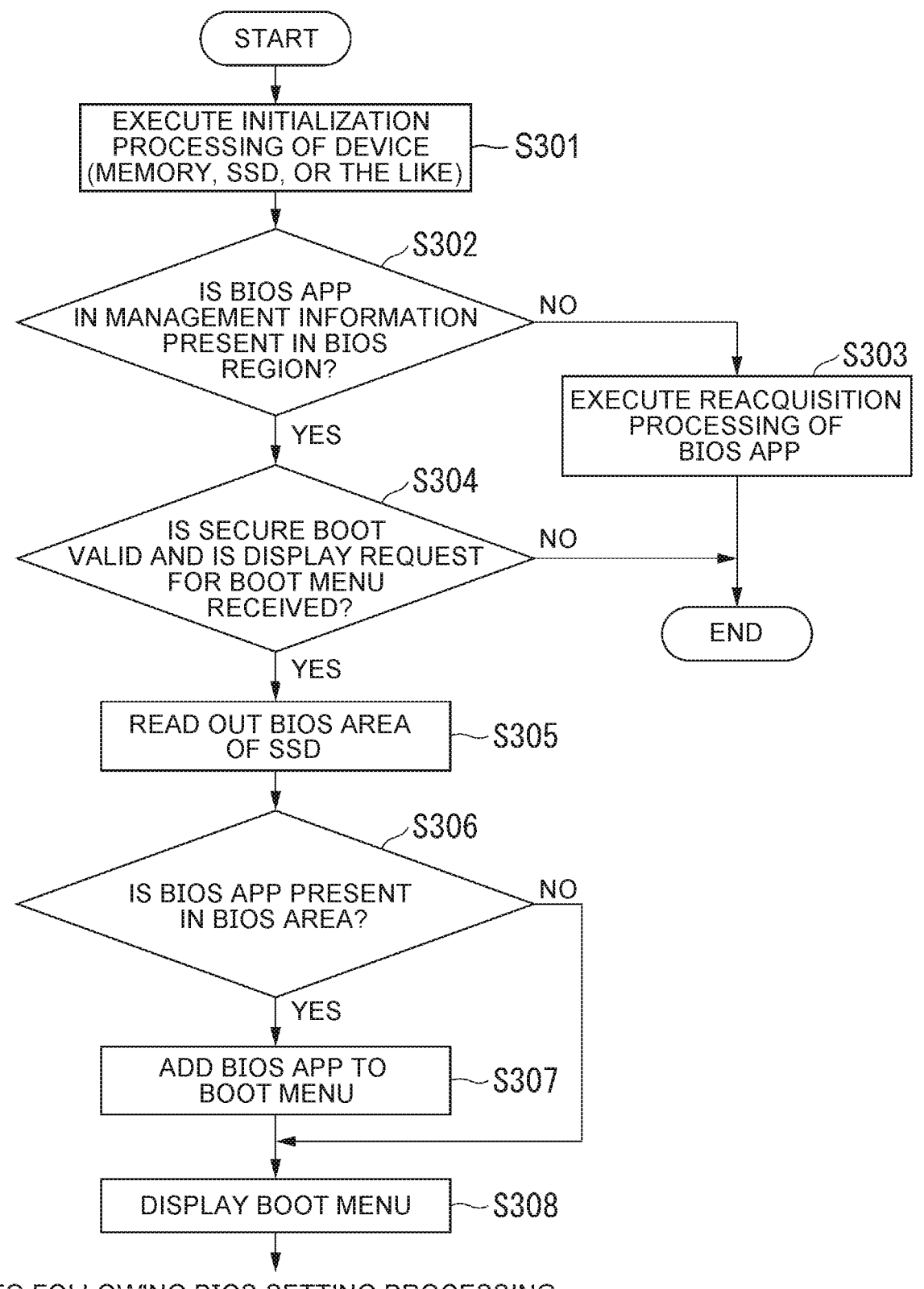
FIG. 10 is a flowchart illustrating an example of startup processing of the laptop PC in the information processing system according to one or more embodiments.

FIG. 10 is a flowchart illustrating an example of the startup processing of the laptop PC 1 in the information processing system 100 according to one or more embodiments.

As illustrated in FIG. 10, in a case in which the power of the laptop PC 1 is turned on, the laptop PC 1 first executes initialization processing of a device (memory, SSD 23, or the like) (step S301). The BIOS processing unit 101 of the laptop PC 1 executes the program stored in the boot program storage unit 221 of the BIOS memory 22 to start the startup processing, and executes initialization of the device mounted on the laptop PC 1.

Next, the BIOS processing unit 101 determines whether or not the BIOS app AP1 in the management information is in the BIOS area 231 (step S302). The BIOS processing unit 101 confirms the BIOS app AP1 stored in the management information storage unit 223 of the BIOS memory 22, and determines whether or not the program of the BIOS app AP1 is present in the BIOS area 231 of the SSD 23. In a case in which the BIOS app AP1 is present in the BIOS area 231 (step S301: YES), the BIOS processing unit 101 proceeds with the processing to step S304, and executes the startup processing by the normal BIOS. In addition, in a case in which the BIOS app AP1 is not present in the BIOS area 231 (step S301: NO), the BIOS processing unit 101 proceeds with the processing to step S303.

In step S303, the BIOS processing unit 101 executes reacquisition processing of the BIOS app AP1.

Specifically, the BIOS processing unit 101 executes the same processing as the processing from step S104 to step S110 illustrated in FIG. 4.

In addition, in step S304, the BIOS processing unit 101 determines whether or not the secure boot is valid and whether or not a display request for the boot menu is received. In a case in which the secure boot is valid, the BIOS processing unit 101 determines whether or not the input unit 32 receives, for example, pressing of a "function 12" (F12) key. In a case in which the display request (pressing of the "F12" key) is received (step S304: YES), the BIOS processing unit 101 proceeds with the processing to step S305. In addition, in a case in which the display request (pressing of the "F12" key) is not received (step S304: NO), the BIOS processing unit 101 terminates the startup processing.

In step S305, the BIOS processing unit 101 reads out the BIOS area 231 of the SSD 23. The BIOS processing unit 101 lists up the BIOS apps AP1 stored in the BIOS area 231.

Next, the BIOS processing unit 101 determines whether or not the BIOS app AP1 is in the BIOS area 231 (step S306). In a case in which the BIOS app AP1 is present in the BIOS area 231 (step S306: YES), the BIOS processing unit 101 proceeds with the processing to step S307. In addition, in a case in which the BIOS app AP1 is not present in the BIOS area 231 (step S306: NO), the BIOS processing unit 101 proceeds with the processing to step S308.

In step S307, the BIOS processing unit 101 adds the BIOS app AP1 to the boot menu.

Next, in step S308, the BIOS processing unit 101 displays the boot menu on the display unit 14. After the processing of step S308, the BIOS processing unit 101 shifts to BIOS setting processing.

As described above, the information processing system 100 according to one or more embodiments includes the server apparatus 40 and the laptop PC 1. The server apparatus 40 encapsulates the program of the BIOS app AP1 (extended function of the BIOS) to which the signature of the user (company, organization, or the like) is assigned, assigns the signature of the server manager to the capsule file CF1 obtained by the encapsulation, and provides the capsule file CF1 to the laptop PC 1 (information processing apparatus). The laptop PC 1 includes the BIOS storage unit 20 and the BIOS processing unit 101. The BIOS storage unit 20 stores the program of the BIOS. In a case in which validity of the capsule file CF1 acquired from the server apparatus 40 is confirmed based on the signature of the server manager, the BIOS processing unit 101 extracts the program of the BIOS app AP1 from the capsule file CF1 to store the program of the BIOS app AP1 in the BIOS storage unit 20. In addition, in a case in which validity of the program of the BIOS app AP1 is confirmed based on the signature certificate of the user and the signature of the user, the BIOS processing unit 101 permits the execution of the program of the BIOS app AP1. In addition, in a case in which the validity of the program of the BIOS app AP1 is not confirmed, the BIOS processing unit 101 prohibits the execution of the program of the BIOS app AP1.

As a result, the information processing system 100 according to one or more embodiments can, for example, easily incorporate the service (extended function or BIOS app) prepared by the user, such as the company, into the BIOS, and can more securely and easily extend the function of the BIOS.

In addition, for example, in a case in which the user wants to extend the function of his/her own BIOS, in the related art, it is required for the user to prepare his/her own server apparatus and distribute the BIOS app having the extended function. On the other hand, in the information processing system 100 according to one or more embodiments, the server apparatus 40 managed by the manufacturer, the vender, or the supplier can be used as it is, and the user does not need to prepare his/her own server apparatus. Therefore, the information processing system 100 according to one or more embodiments can easily and simply extend the function of the BIOS by using the server apparatus 40.

In addition, in one or more embodiments, the BIOS storage unit 20 includes the BIOS memory 22 and the BIOS area 231. The BIOS memory 22 is a rewritable non-volatile memory that cannot be connected from the OS without going through the BIOS, and stores at least the boot program required to start up the OS and the management information of the BIOS app AP1. The BIOS area 231 is the partial area of the SSD 23, and is the area that cannot be connected from the OS without going through the BIOS. In a case in which the validity of the capsule file CF1 is confirmed, the BIOS processing unit 101 extracts the program of the BIOS app AP1 from the capsule file CF1 to store the program of the BIOS app AP1 in the BIOS area 231.

As a result, in the information processing system 100 according to one or more embodiments, for example, as illustrated in FIG. 8, in a case in which the SSD 23 is stolen by the third party with malicious intent and is attached to the PC owned by the third party, it is not possible to execute the BIOS app AP1 on the PC owned by the third party. Therefore, the information processing system 100 according to one or more embodiments can more securely and easily extend the function of the BIOS.

In addition, in one or more embodiments, in a case in which the management information of the BIOS app AP1 is stored in the BIOS memory 22 and the program of the BIOS app AP1 is not stored in the BIOS area 231 when the BIOS is started up, the BIOS processing unit 101 reacquires the capsule file CF1 corresponding to the program of the BIOS app AP1 from the server apparatus 40.

As a result, in the information processing system 100 according to one or more embodiments, for example, as illustrated in FIG. 9, even in a case in which the SSD 23 of the laptop PC 1 is replaced, the BIOS app AP1 can be appropriately reacquired, and the laptop PC 1 can be appropriately restored.

In addition, in one or more embodiments, in a case in which the signature certificate of the user is not stored in the BIOS memory 22, the BIOS processing unit 101 prohibits the execution of the program of the BIOS app AP1.

As a result, in the information processing system 100 according to one or more embodiments, only the valid laptop PC 1 that stores the signature certificate of the user can use the BIOS app AP1, and thus it is possible to suppress improper use.

In addition, in one or more embodiments, the server apparatus 40 includes the update file storage unit 421 and the distribution processing unit 432. The update file storage unit 421 stores the capsule file CF1 to which the signature of the server manager is assigned. The distribution processing unit 432 transmits the capsule file CF1 corresponding to the distribution request to the laptop PC 1 in response to the distribution request for the capsule file CF1.

As a result, in the information processing system 100 according to one or more embodiments, since the extended function (BIOS app AP1) is distributed to the laptop PC 1 by using the capsule file CF1, the function can be more securely extended.

In addition, in one or more embodiments, in a case in which the validity of the capsule file CF1 is confirmed when the laptop PC 1 is restarted up after storing the capsule file CF1 acquired from the server apparatus 40 in an area different from the BIOS area 231 of the SSD 23, the BIOS processing unit 101 extracts the program of the BIOS app AP1 from the capsule file CF1 to store the program of the BIOS app AP1 in the BIOS area 231.

As a result, in the information processing system 100 according to one or more embodiments, in the laptop PC 1, since the program of the BIOS app AP1 is extracted from the capsule file CF1 and stored in the BIOS area 231, the function can be more securely extended.

The BIOS update method according to one or more embodiments is a BIOS update method of updating the BIOS of the laptop PC 1 including the BIOS storage unit 20 that stores the program of the BIOS, and includes a distribution step and a BIOS processing step. In the distribution step, the server apparatus 40 encapsulates the program of the BIOS app AP1 (extended function of the BIOS) to which the signature of the user is assigned, assigns the signature of the server manager to the capsule file CF1 obtained by the encapsulation, and provides the capsule file CF1 to the laptop PC 1. In the BIOS processing step, the laptop PC 1 extracts the program of the BIOS app AP1 from the capsule file CF1 to store the program of the BIOS app AP1 in the BIOS storage unit 20 in a case in which the validity of the capsule file CF1 acquired from the server apparatus 40 is confirmed based on the signature of the server manager, permits the execution of the program of the BIOS app AP1 in a case in which the validity of the program of the BIOS app AP1 is confirmed based on the signature certificate of the user and the signature of the user, and prohibits the execution of the program of the BIOS app AP1 in a case in which the validity of the program of the BIOS app AP1 is not confirmed.

As a result, the BIOS update method according to one or more embodiments has the same effect as the information processing system 100 described above, and the function of the BIOS can be more securely and easily extended.

It should be noted that the present invention is not limited to the one or more embodiments described above, and the present invention can be modified without departing from the gist of the present invention.

For example, in the one or more embodiments described above, the example in which the information processing apparatus is the laptop PC 1 is described, but the present invention is not limited to this, and for example, another information processing apparatus, such as a tablet terminal apparatus or a desktop PC, may be used. In addition, the information processing apparatus is not limited to the configuration including the main control unit 10 and the sub-control unit (embedded controller 31), and may have a configuration in which one control unit includes the BIOS processing unit 101.

In addition, in the one or more embodiments described above, for convenience of description, the example in which the laptop PC 1 is connected to the information processing system 100 is described, but the present invention is not limited to this, and the information processing system 100 may include a plurality of laptop PCs 1.

In addition, in the one or more embodiments described above, the embedded controller 31 may hold a part of the information stored in the BIOS memory 22. For example, the embedded controller 31 may store a part of sensitive information for confirming the validity of the program of the BIOS. In this case, a part of the BIOS can be confirmed by the embedded controller 31, and thus the update can be performed independently of the BIOS memory 22.

In addition, in the one or more embodiments described above, the embedded controller 31 may execute a part of the processing executed by the BIOS processing unit 101.

It should be noted that each configuration of the information processing system 100 described above has a computer system inside. A processing in each configuration of the information processing system 100 described above may be performed by recording a program for realizing the function of each configuration of the information processing system 100 described above on a computer-readable recording medium, and reading the program recorded on the recording medium with the computer system to execute the program. Here, "reading the program recorded on the recording medium with the computer system to execute the program" includes installing the program in the computer system. The "computer system" herein includes hardware, such as the OS or peripheral devices.

In addition, the "computer system" may include a plurality of computer apparatuses connected via a network including a communication line, such as the Internet, a WAN, a LAN, or a dedicated line. In addition, the "computer-readable recording medium" is a portable medium, such as a flexible disk, a magneto-optical disk, a ROM, or a CD-ROM, and a storage device, such as a hard disk built into the computer system. As described above, the recording medium that stores the program may be a non-transitory recording medium, such as a CD-ROM.

The recording medium also includes an internal or external recording medium that can be accessed from a distribution server to distribute the program. It should be noted that a configuration may be used in which the program is divided into a plurality of programs, downloaded at different timings, and then combined with each configuration of the information processing system 100, or distribution servers for distributing the respective divided programs may be different. Further, the "computer-readable recording medium" includes a medium that stores the program for a certain period of time, such as a volatile memory (RAM) inside the computer system that serves as a server or a client in a case in which the program is transmitted via the network. The program described above may be a program for realizing some of the functions described above. Further, the program may be a so-called difference file (difference program) in which the functions described above can be realized in combination with the program already recorded in the computer system.

In addition, a part or all of the functions described above may be realized as an integrated circuit, such as a Large Scale Integration (LSI). Each of the functions described above may be individually realized as a processor, and a part or all of the functions may be integrated into a processor. A method of achieving the integrated circuit is not limited to the LSI, and may be realized by a dedicated circuit or a general-purpose processor. In a case in which advances in a semiconductor technology leads to appearance of an integrated circuit technology that replaces the LSI, an integrated circuit on the basis of the technology may be used.

DESCRIPTION OF SYMBOLS

1 laptop PC
10 main control unit
11 CPU
12 main memory
13 video subsystem
14, 53 display unit
20 BIOS storage unit
21 chipset
22 BIOS memory
23 SSD
24 audio system
25 WLAN card
26 USB connector
31 embedded controller (EC)
32, 52 input unit
33 power supply circuit
40 server apparatus
41, 51 NW communication unit
42 server storage unit
43 server control unit
50 user terminal apparatus
54 terminal storage unit
55 terminal control unit
100 information processing system
101 BIOS processing unit
221 boot program storage unit
222 certificate storage unit
223 management information storage unit
231 BIOS area
232 EFI system area
421 update file storage unit
431 registration processing unit
432 distribution processing unit
AP1 BIOS app
CF1 capsule file
NW1 network

What is claimed is:

1. An information processing system comprising:
a server that encapsulates a program of an extended function of a basic input output system (BIOS) to which a signature of a user is assigned, assigns a signature of a server manager to an encapsulated capsule file, and provides the encapsulated capsule file to an information processing apparatus;
wherein the information processing apparatus includes:
a BIOS storage that stores a program of the BIOS, and
a BIOS processor that extracts the program of the extended function from the encapsulated capsule file to store the program of the extended function in the BIOS storage in a case in which validity of the encapsulated capsule file acquired from the server is confirmed based on the signature of the server manager, permits execution of the program of the extended function in a case in which validity of the program of the extended function is confirmed based on a signature certificate of the user and the signature of the user, and prohibits execution of the program of the extended function in a case in which the validity of the program of the extended function is not confirmed, wherein the BIOS storage includes a BIOS memory that is a rewritable non-volatile memory, which is not connectable from an operating system (OS) without going through the BIOS, and stores at least a boot program required to start up the OS and management information of the extended function, and a BIOS area that is a partial area of a solid state drive (SSD) and is not connectable from the OS without going through the BIOS, and in a case in which the validity of the encapsulated capsule file is confirmed, the BIOS processor extracts the program of the extended function from the encapsulated capsule file to store the program of the extended function in the BIOS area.

2. The information processing system according to claim 1, wherein, in a case in which the management information of the extended function is stored in the BIOS memory and the program of the extended function is not stored in the BIOS area when the BIOS is started up, the BIOS processor reacquires the encapsulated capsule file corresponding to the program of the extended function from the server.

3. The information processing system according to claim 1, wherein, in a case in which the signature certificate of the user is not stored in the BIOS memory, the BIOS processor prohibits execution of the program of the extended function.

4. The information processing system according to claim 1, wherein the server includes:

an update file storage that stores the encapsulated capsule file to which the signature of the server manager is assigned, and a distribution processor that transmits, in response to a distribution request for the encapsulated capsule file, the encapsulated capsule file corresponding to the distribution request to the information processing apparatus.

5. The information processing system according to claim 1, wherein, in a case in which the validity of the encapsulated capsule file is confirmed when the information processing apparatus is restarted up after storing the encapsulated capsule file acquired from the server in an area different from the BIOS area of the SSD, the BIOS processor extracts the program of the extended function from the encapsulated capsule file, and stores the program of the extended function in the BIOS area.

6. A basic input output system (BIOS) update method of updating a BIOS of an information processing apparatus including a BIOS storage that stores a program of the BIOS, the BIOS update method comprising:

a distribution step of, via a server, encapsulating a program of an extended function of the BIOS to which a signature of a user is assigned, assigning a signature of a server manager to an encapsulated capsule file, and providing the encapsulated capsule file to the information processing apparatus; and a BIOS processing step of, via the information processing apparatus, extracting the program of the extended function from the encapsulated capsule file to store the program of the extended function in the BIOS storage in a first case in which validity of the encapsulated capsule file acquired from the server is confirmed based on the signature of the server manager, permitting execution of the program of the extended function in a case in which validity of the program of the extended function is confirmed based on a signature certificate of the user and the signature of the user, and prohibiting execution of the program of the extended function in a second case in which the validity of the program of the extended function is not confirmed, wherein the BIOS storage includes a BIOS memory that is a rewritable non-volatile memory, which is not connectable from an operating system (OS) without going through the BIOS, and stores at least a boot program required to start up the OS and management information of the extended function, and a BIOS area that is a partial area of a solid state drive (SSD) and is not connectable from the OS without going through the BIOS, and in a case in which the validity of the encapsulated capsule file is confirmed, the program of the extended function is extracted from the encapsulated capsule file to store the program of the extended function in the BIOS area.

* * * * *